United States Patent [19]
Yowell et al.

[11] Patent Number: 5,829,470
[45] Date of Patent: Nov. 3, 1998

[54] DIFFERENTIAL VOLUME SENSING HYDRAULIC CONTROL

[75] Inventors: Gordon Yowell; Stephen Kaylor; Düane Samuelson, all of Boca Raton; Alvin S. Blum, Fort Lauderdale, all of Fla.

[73] Assignee: Predator Systems Incorporated, Boca Raton, Fla.

[21] Appl. No.: 893,713

[22] Filed: Jul. 11, 1997

[51] Int. Cl.⁶ ............................. F15B 13/044; F15B 20/00
[52] U.S. Cl. ..................... 137/87.06; 91/459; 137/87.03; 137/456; 137/624.12; 137/625.65
[58] Field of Search ........................... 91/459; 137/87.03, 137/87.06, 456, 624.12, 625.65

[56] References Cited

U.S. PATENT DOCUMENTS

| | | | |
|---|---|---|---|
| 3,029,637 | 4/1962 | Fellows | 73/194 |
| 3,505,513 | 4/1970 | Fowler et al. | 235/151.34 |
| 3,711,689 | 1/1973 | Park | 235/151.34 |
| 3,723,987 | 3/1973 | Barone et al. | 340/242 |
| 3,909,596 | 9/1975 | Sullivan | 235/92 PD |
| 4,118,780 | 10/1978 | Hirano | 364/510 |
| 4,205,592 | 6/1980 | Haussler | 91/459 X |
| 4,892,114 | 1/1990 | Maroney et al. | 137/87 |
| 4,970,941 | 11/1990 | Reinhardt | 91/459 X |
| 5,287,884 | 2/1994 | Cohen | 137/624.12 X |
| 5,507,466 | 4/1996 | Yowell et al. | 251/16 |

OTHER PUBLICATIONS

PIC14000 Mixed Signal Controller, Microchip Technology Inc., 2 pages (1996).
Mark V Target Strain Gage Target Flowmeter, Hersey Measurement Co., M711 (1988) 16 pages.

Primary Examiner—Gerald A. Michalsky
Attorney, Agent, or Firm—Alvin S. Blum

[57] ABSTRACT

A valve assembly senses the cumulative volume of hydraulic fluid that has passed to an actuator and senses and subtracts from that cumulative volume the volume of return fluid that has passed from the actuator. When the difference between the volumes exceeds a preset value, the system shuts off the flow to the actuator to prevent further loss of fluid from a leak. The assembly may employ separate sensors in separate pressure and return lines or a common line with a common sensor which reverses signal polarity when flow reverses. Target flowmeters with signal adding and subtracting circuits may provide the differential volume information.

18 Claims, 4 Drawing Sheets

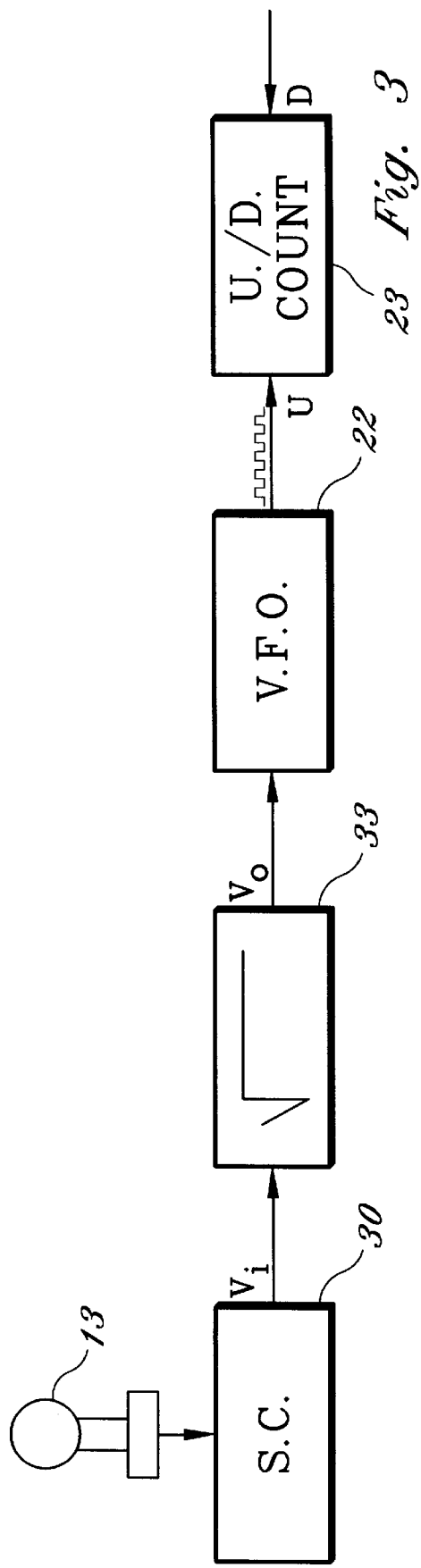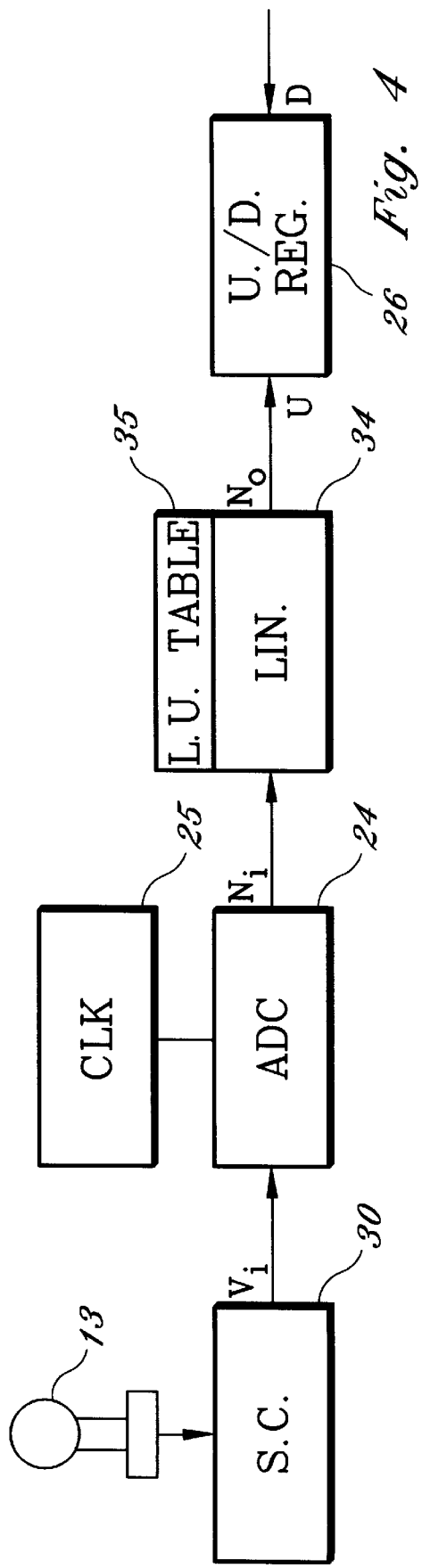

5,829,470

DIFFERENTIAL VOLUME SENSING HYDRAULIC CONTROL

FIELD OF THE INVENTION

This invention relates to controls for hydraulic systems and more particularly to means for monitoring the volumes of fluid flowing into and out of hydraulic elements and actuators to provide signals or cut off flow when the difference in volumes is greater than a preset volume to be expected from normal operation to respond to a leak in the hydraulic circuit.

BACKGROUND OF THE INVENTION

Hydraulic systems generally provide fluid under pressure to an actuator such as a hydraulic motor or piston. The fluid then returns at a lower pressure to the hydraulic reservoir and pump. In the case of a piston, such as might be used on an aircraft control surface, the piston may not return to its original position for many hours in an unbalanced system. Consequently, the volume of fluid that went out to move the piston may not return for many hours.

When a leak develops in a critical hydraulic line, it is often useful to automatically cut off fluid flow to that line.

U.S. Pat. No. 5,507,466 issued Apr. 16, 1996 to two of the applicants discloses a hydraulic fuse valve that will automatically shut off pressurized hydraulic fluid when a predetermined volume of fluid has passed therethrough. It automatically resets on a drop in pressure before the next cycle. The device is entirely mechanical and hydraulic. It must be specially constructed for each volume. When the valve is installed in line with an actuator, it will shut off the fluid flow in the event of a leak of a preset volume greater than the volume needed to operate the actuator. It does not monitor the volume of return flow. It does prevent dangerous escape of hydraulic fluid and loss of fluid and pressure in the rest of the system.

U.S. Pat. No. 4,892,114 issued Jan. 9, 1989 to Maroney et al. discloses a valve for monitoring the pressure and return fluid flow rates in a hydraulic system and shutting off flow in the event that a difference in flow rate signals exceeds a certain magnitude. Although this system uses electronic signals, it is responsive to flow rates and not volumes, so it would not be able to distinguish between a leak and an unbalanced piston actuation when there is a delay in return of the piston, for example.

SUMMARY OF THE INVENTION

It is, accordingly, an object of the invention to provide a differential volume sensing hydraulic control that will automatically provide a signal and/or actuate a valve when a predetermined difference in volume between that passed into a circuit and that returned from the circuit exists. It is another object that the control include software means for adjusting the differential volume threshold that will trigger operation of signal and/or valve so that the device may be readily adapted to various applications without mechanical modifications.

The control of the invention includes: a flowmeter in the pressure line providing a first electrical signal reflecting flow rate in the pressure line; a flowmeter in the return line providing a second electrical signal reflecting flow rate in the return line; signal conditioning means for receiving the first and second electrical signals to provide conditioned first and second output voltage signals that are directly proportional to flow rates; first and second voltage variable oscillators receiving the first and second voltage signals; an up-down counter receiving up counts from the first oscillator and down counts from the second oscillator, each count representing a discrete volume, and means for generating a signal, and/or a valve closure when the up-down counter reaches a preset value, thereby indicating a preset difference in volume between inflow and outflow has been reached. That volume is preset in software to represent a volume greater than can be expected from normal operation of the system. It is a volume indicative of a leak somewhere between the two flowmeters.

In another embodiment of the invention, signals from the two flowmeters are repeatedly digitized at preset time intervals. The resulting digital values, each representing the volume of fluid flowing during each time interval, are added to a register (pressure flowmeter) and subtracted (return flowmeter) from the register. The signal and/or valve actuation is generated when the register reaches a preset value.

That preset value represents a specific volume of fluid lost from the circuit.

In yet another embodiment of the invention, a common line sends pressurized hydraulic fluid to the actuator and receives return fluid from the actuator. A single flowmeter generates a flow proportional electrical signal of a first polarity when fluid flows in a first direction and a signal of a second, and opposite polarity when fluid flows in a second direction.

These and other objects, advantages and features of the invention will become more apparent when the detailed description is considered in conjunction with the drawings, in which like elements are indicated by like reference characters in the various drawing figures.

BRIEF DESCRIPTION OF THE DRAWINGS

FIG. 3 is a detail of a portion of a valve assembly of the invention with analog linearizing means shown schematically. FIG. 4 is a detail of a portion of a valve assembly of the invention with digital linearizing means shown schematically.

DETAILED DESCRIPTION OF PREFERRED EMBODIMENTS

Figure 1:
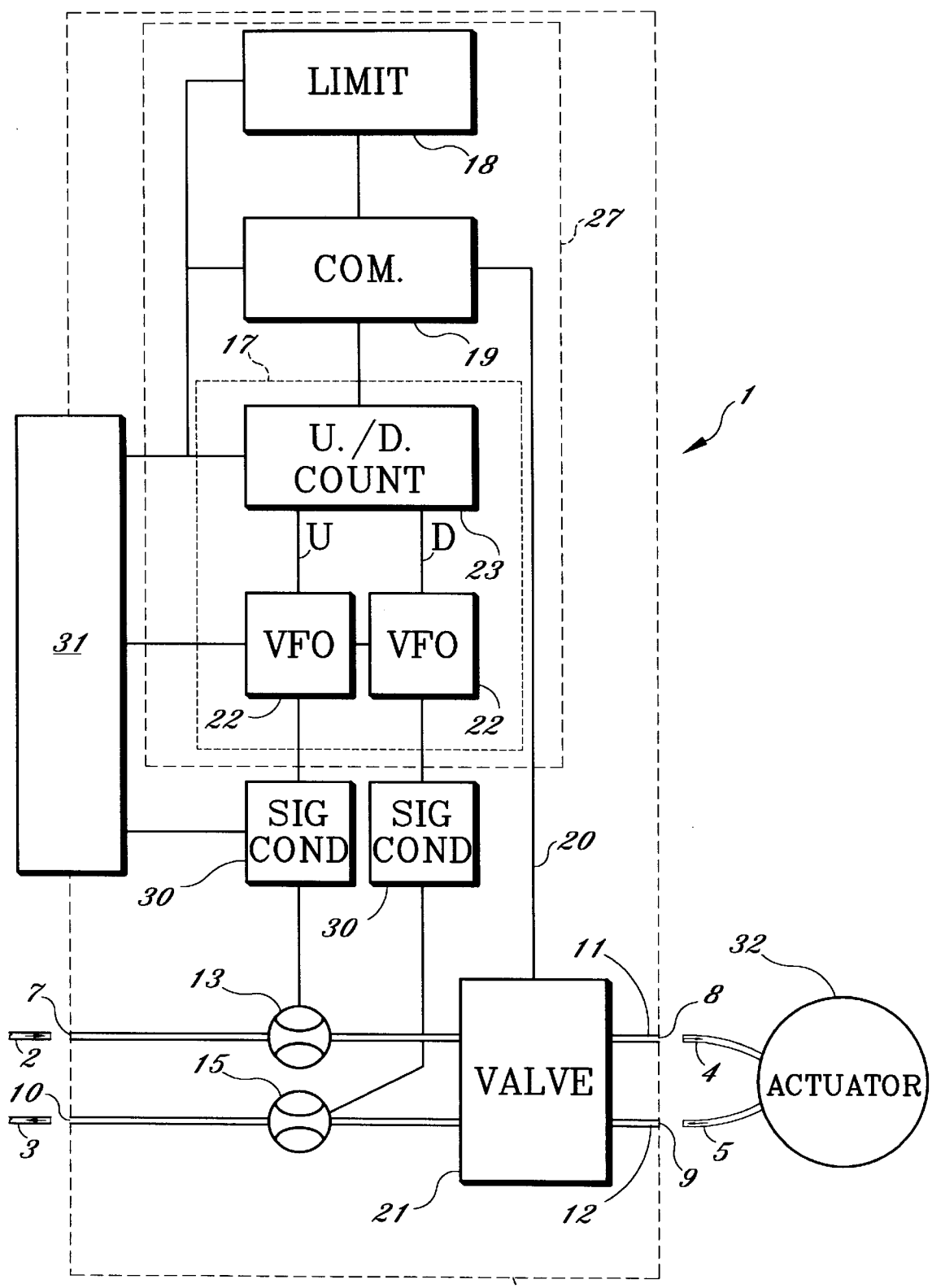
FIG. 1 is a schematic diagram of a differential volume sensing shut off valve assembly of the invention.

Referring now first to FIG. 1, a differential volume sensing shut off valve assembly 1 of the invention comprises a valve body 6 having a first entrance port 7 for connection to the pressure line 2 of a conventional hydraulic system (not shown) and a first exit port 8 for connection to the upstream portion 4 of the hydraulic line powering a hydraulic actuator 32 such as a piston or a motor. A first channel 11 connects the entrance port 7 and the exit port 8. A second entrance port 9 in valve body 6 connects to the upstream portion 5 of the hydraulic line receiving return fluid from actuator 32. A second exit port 10 connects to the return line 3 of the hydraulic system. A second channel 12 connects ports 9 and 10. An electrically operated valve 21 may open and close fluid flow in one or both of channels 11 and 12. The valve 21 may be any of the valve types well known in the art such as, but not limited to, direct solenoid valves, hydraulically operated with solenoid pilot, and the like. Valve 21 is operated by a signal from comparator 19 thru signal line 20. Comparator 19 generates a shut off signal to valve 21 when the total volume of fluid that has passed to the actuator through channel 11 is greater than the total volume of fluid that has passed from the actuator through channel 12 by a predetermined limit that is preset by software in storage means 18. The mechanism by which the system determines the difference between the volume flowing to the actuator and the volume flowing from the actuator will now be described.

Flowmeters 13 and 15 in channels 11 and 12 emit signals that are proportional to instantaneous flow rate in the channels. These flowmeters may be of conventional design. The well-known target type flowmeters have been found to be useful in this application. The signals may be fed through signal conditioning circuits 30 of the types well known in the art which may include amplification stages and the like before the signals are fed to variable frequency oscillators 22. The output from the oscillators are then fed to an up/down counter 23. The signal from flowmeter 13 feeds into the up or addition portion of counter 23 as a train of pulses whose frequency is proportional to flow to the actuator, in effect providing a total volume of flow in a first direction.

The signal from flowmeter 15 feeds into the down or subtraction portion of counter 23 as a train of pulses whose frequency is proportional to flow from the actuator, subtracting from the total in the counter produced by the flow in the first direction the flow in the second or return direction. The net count in counter 23 is the difference at any time between the volume in the two directions. This is the value that is being continuously compared with the value stored in storage means 18. The components within the phantom line 17 may be considered a difference determining means. They may be individual components or modules or incorporated in whole or part in an integrated form such as a microcontroller and may be powered by an external or self contained power source 31. The microcontroller 27 may include all of the elements within the phantom line.

Figure 2:
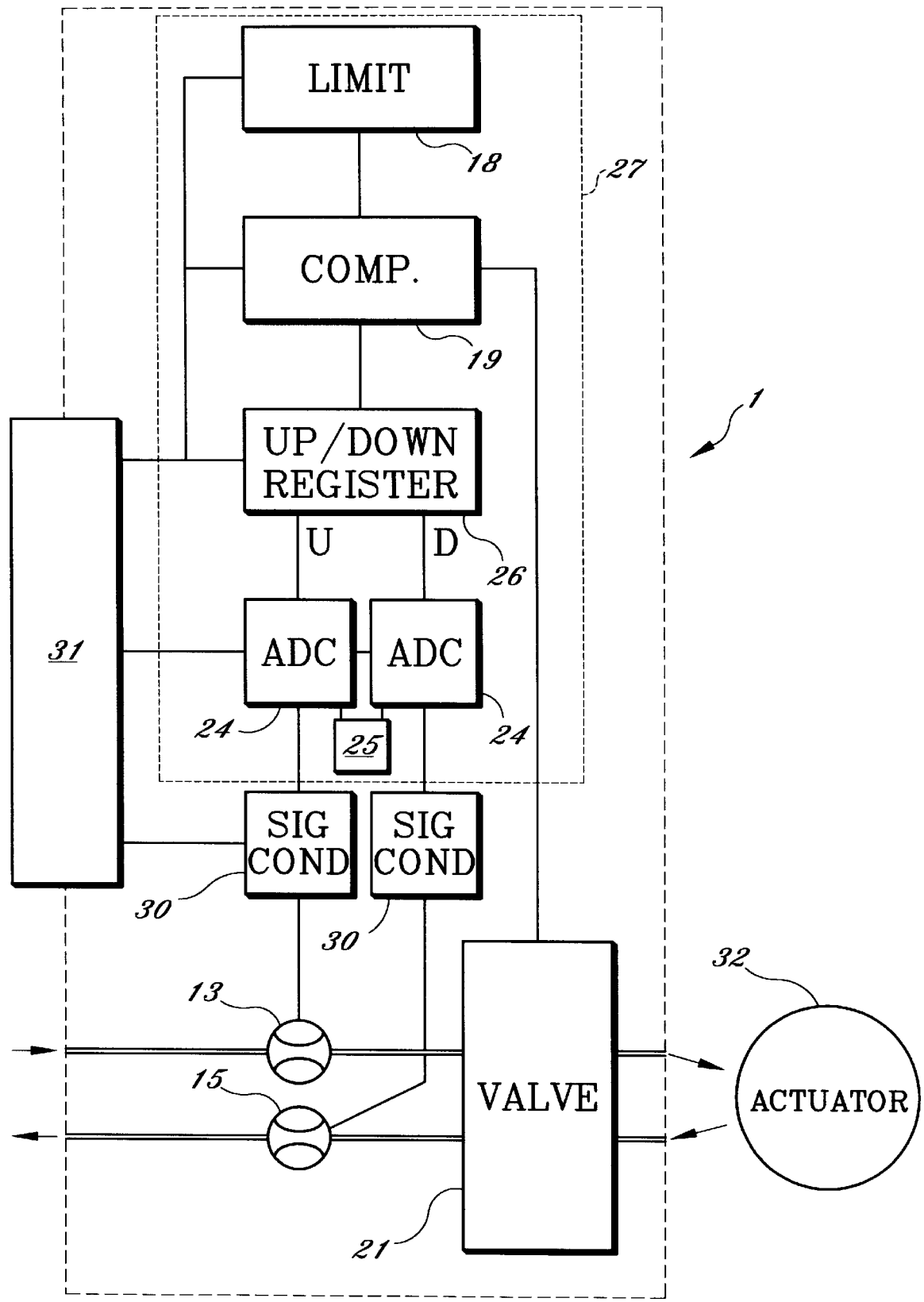
FIG. 2 is a schematic diagram of another embodiment of the invention.

Referring now to the valve assembly of FIG. 2, its structure is much the same as that of FIG. 1, with the exception of the means for determining the difference in the cumulative volume of fluid that has passed in pressure and return directions. In this case the conditioned signals from the flowmeters 13, 15 are fed from the signal conditioners 30 to analog to digital converters (ADC) 24 of conventional design. These may be triggered periodically by clock 25 to hold a conditioned analog signal and convert it to a digital value that is either added at U or subtracted at D in the up/down register 26 so that the numerical value stored at 26 at any time represents a difference in volume of fluid that has passed in the opposite directions to and from the actuator. Comparator 19 compares that difference value to the value preset in storage means 18 which is set to a value that will only be exceeded when a leak occurs in the system. Many of the electronic elements may be part of a conventional microcontroller 27 that is programmed for this special function. The signal output from a flowmeter to the up/down register or counter may not be linear over the range of flows experienced by the invention. This non-linearity may be inherent in the flowmeter or introduced by the signal conditioner, the variable frequency oscillator, or the analog to digital converter for example. If not corrected, the differential volume determined by the up/down register or counter would be in error. This problem is overcome by introducing a linearizing means in the circuit.

Referring now to FIG. 3, a target flowmeter 13 emits an analog signal that is proportional to the square of the flow rate. The signal from the flowmeter is amplified by signal conditioner 30 and then fed to an analog linearizing means 33 which puts out a voltage Vo that is the square root of the input voltage Vi. Such circuitry is well known in the art. The voltage Vo is then fed to the variable frequency oscillator 22 which feeds a train of pulses to the up or down side of up/down counter. The train of pulses having a frequency that is a linear function of the flow rate at any time.

Referring now to FIG. 4, a target flowmeter 13 emits an analog signal that is non-linearly proportional to the flow rate. The signal is fed to signal conditioner 30 which feeds a voltage Vi to analog to digital converter (ADC) 24. Under the control of clock 25, at preset time intervals, ADC 24 sends a digital number Ni to linearizer 34 that corresponds to the analog value of Vi. Linearizer 34 incorporates a look up table 35 made up by calibration of the flowmeter, with an empirically known flow rate number for each number Ni produced by the flowmeter. The linearizer 34 looks up a true flow rate number No that corresponds to Ni in the table and feeds this to the add U or subtact D input of the register 26. This number is a representation of the volume that has flowed through the channel during the time interval. As in the calculus, the shorter the time intervals between digitizing, the closer we come to the true volume. In practical terms, the time intervals need not be very short in the usual hydraulic application.

In certain hydraulic circuits, the pressurized hydraulic fluid is fed to the actuator through the same channel that receives the return fluid from the actuator. In these situations, it is possible to simplify the structure of the invention with the use of a single flowmeter that emits a positive signal when fluid flows past it in a first direction and that emits a negative signal when fluid flows past it in a second direction.

Figure 5:
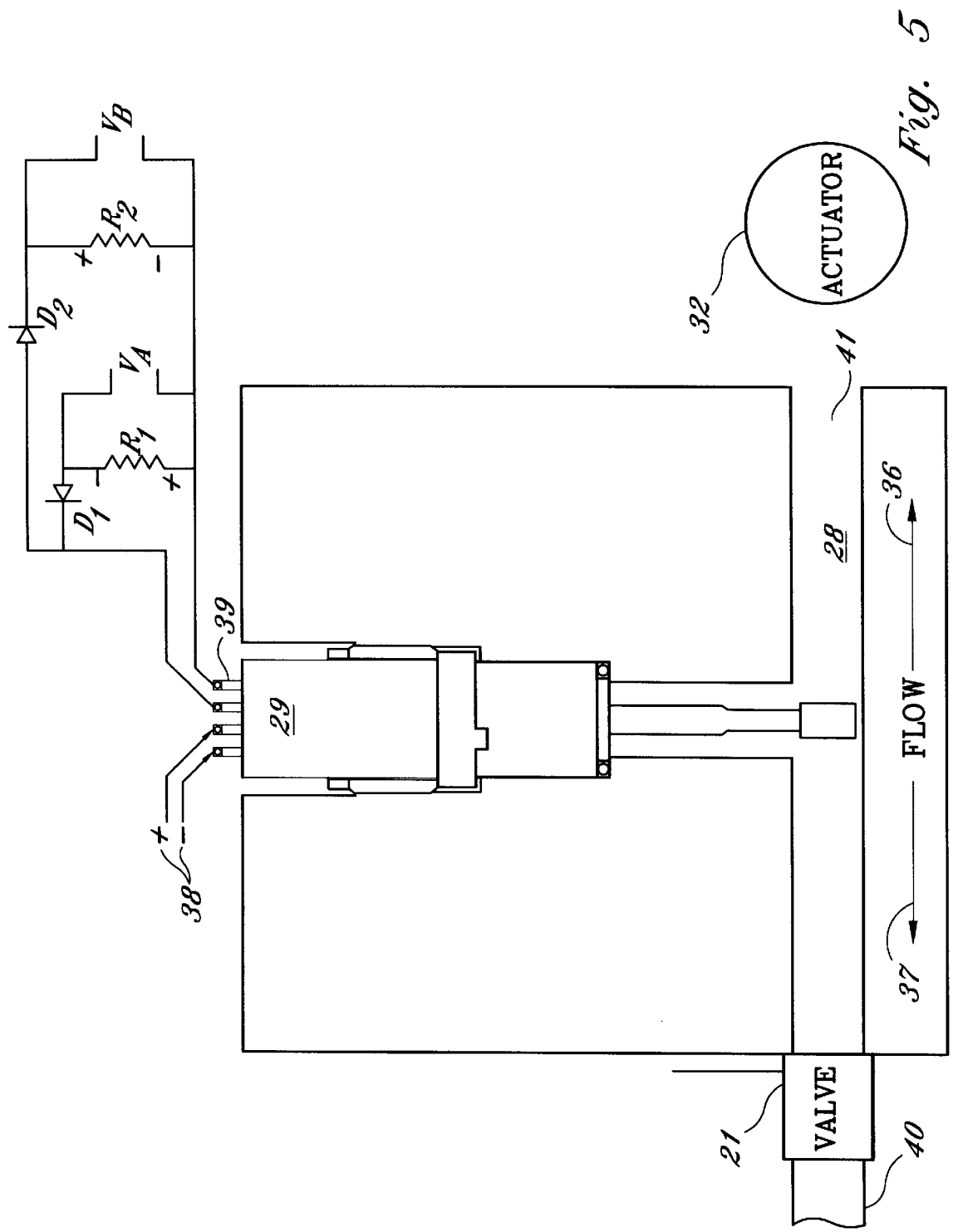
FIG. 5 is a detail of another embodiment of the invention showing schematically a single flowmeter in a single channel with bidirectional hydraulic flow.

This is shown schematically in FIG. 5, in which target flowmeter 29 is installed in the common channel 28 through which pressurized hydraulic fluid passes from entrance port 40 to exit port 41 in a first direction 36 to power actuator 32 and in a second direction 37 on return from the actuator. The flowmeter 29 is powered by excitation voltage 38. When fluid flows in first direction 36 a voltage of a first polarity appears at the output terminals 39 of the flowmeter. Diode D1 conducts and a voltage appears across resistor R1 which is the signal output VA that is fed to the pressure signal input of the signal conditioner such as in FIGS. 1 and 2. Diode D2 is not conducting and no voltage appears at VB. When return fluid flows in direction 37, the polarity of the voltage at terminals 39 reverses. Zero voltage appears at VA, and a voltage appears at VB which is fed to the signal conditioner for the return flow signal of the systems such as that shown in FIGS. 1 or 2.

The above disclosed invention has a number of particular features which should preferably be employed in combination although each is useful separately without departure from the scope of the invention. While we have shown and described the preferred embodiments of our invention, it will be understood that the invention may be embodied otherwise than as herein specifically illustrated or described, and that certain changes in the form and arrangement of parts and the specific manner of practicing the invention may be made within the underlying idea or principles of the invention.

What is claimed is:

1. A differential volume sensing shut off valve assembly to be installed in the hydraulic fluid pressure and return lines between upstream and downstream portions of a hydraulic circuit for isolating the circuit in response to a leakage of a predetermined volume of fluid therefrom, the valve assembly comprising:

a valve body having a first entrance port and a first exit port for connectably interposing in the fluid pressure line of the upstream portion of the hydraulic circuit and a second entrance port and a second exit port for connectably interposing in the fluid return line of the downstream portion of the hydraulic circuit;

a first channel in the valve body connecting the first entrance port to the first exit port;

a second channel in the valve body connecting the second entrance port to the second exit port;

first sensing means in the first channel for sensing volume of fluid flowing therethrough;

second sensing means in the second channel for sensing volume of fluid flowing therethrough;

first summing means in the valve body operatively connected to the first sensing means for accumulating volume of fluid flow information on fluid flowing in the first channel;

second summing means in the valve body operatively connected to the second sensing means for accumulating volume of fluid flow information on fluid flowing in the second channel;

difference determining means connected to the first and second summing means for determining the difference between the cumulative fluid flow volume information in the first and second channels;

storage means in the valve body for storing a preset differential cumulative volume value;

comparator means in the valve body connected to the storage means and the difference determining means for generating a shut off signal when the difference between the cumulative fluid flow volume information in the first and second channels exceeds the preset differential cumulative volume value; and valve means in the valve body in at least one of the first and second channels for shutting off the fluid flow therein when a shut off signal is received, the valve means being operatively connected to the comparator means.

2. A differential volume sensing shut off valve assembly to be installed in the hydraulic fluid pressure and return lines between upstream and downstream portions of a hydraulic circuit for isolating the circuit in response to a leakage of a predetermined volume of fluid therefrom, the valve assembly comprising:

a first entrance port and a first exit port for connectably interposing in the fluid pressure line of the upstream portion of the hydraulic circuit and a second entrance port and a second exit port for connectably interposing in the fluid return line of the downstream portion of the hydraulic circuit;

a first channel connecting the first entrance port to the first exit port;

a second channel connecting the second entrance port to the second exit port;

first sensing means in the first channel for sensing volume of fluid flowing therethrough;

second sensing means in the second channel for sensing volume of fluid flowing therethrough;

first summing means operatively connected to the first sensing means for accumulating volume of fluid flow information on fluid flowing in the first channel;

second summing means operatively connected to the second sensing means for accumulating volume of fluid flow information on fluid flowing in the second channel;

difference determining means connected to the first and second summing means for determining the difference between the cumulative fluid flow volume information in the first and second channels;

storage means for storing a preset differential cumulative volume value;

comparator means connected to the storage means and the difference determining means for generating a shut off signal when the difference between the cumulative fluid flow volume information in the first and second channels exceeds the preset differential cumulative volume value; and valve means in at least one of the first and second channels for shutting off the fluid flow therein when a shut off signal is received, the valve means being operatively connected to the comparator means.

3. The valve assembly according to claim 2, in which the first and second sensing means are target flowmeters.

4. The valve assembly according to claim 3, in which the first and second summing means and difference determining means comprise variable frequency oscillators and counter means for receiving up counts from one of the oscillators and down counts from the other oscillator.

5. The valve assembly according to claim 4, in which the preset differential cumulative volume value is software adjustable.

6. The valve assembly according to claim 5, in which the first and second summing means, the difference determining means, the storage means, and the comparator means are all contained within an integral microcontroller.

7. The valve assembly according to claim 3, in which the first and second summing means and difference determining means comprise means for providing digital output signals from said first and second sensing means at predetermined time intervals and means for adding up the digital output signals from one of the sensing means and substracting the digital output signals from the other of the sensing means.

8. The valve assembly according to claim 7, in which the preset differential cumulative volume value is software adjustable.

9. The valve assembly according to claim 8, in which the first and second summing means, the difference determining means, the storage means, and the comparator means are all contained within an integral microcontroller.

10. A differential volume sensing shut off valve assembly adapted to be installed in a hydraulic circuit for supplying hydraulic fluid to, and receiving hydraulic fluid from a hydraulic actuator for isolating the circuit in response to a leakage of a predetermined volume of fluid therefrom, the valve comprising:

at least one entrance port and at least one exit port adapted for connectably interposing in fluid connection with a hydraulic pressure source at the at least one entrance port and with a hydraulic actuator at the at least one exit port;

first means for sensing volume of fluid flowing between at least one entrance port and at least one exit port;

second means for sensing volume of fluid flowing between at least one exit port and at least one entrance port;

first summing means operatively connected to the first sensing means for accumulating volume of fluid flow information on fluid flowing from at least one entrance port to at least one exit port;

second summing means operatively connected to the second sensing means for accumulating volume of fluid flow information on fluid flowing from at least one exit port to at least one entrance port;

difference determining means connected to the first and second summing means for determining the difference between the cumulative fluid flow volume information received from the first and second summing means;

storage means for storing a preset differential cumulative volume value;

comparator means connected to the storage means and the difference determining means for generating a shut off signal when the determined difference between the first and second summing means exceeds the preset differential cumulative volume value; and valve means for shutting off fluid flow when a shut off signal is received, the valve means being operatively connected to the comparator means, and in fluid connection with at least one entrance port.

11. The valve assembly according to claim 10, in which the first and second sensing means are target flowmeters.

12. The valve assembly according to claim 11, in which the first and second summing means and difference determining means comprise variable frequency oscillators and counter means for receiving up counts from one of the oscillators and down counts from the other oscillator.

13. The valve assembly according to claim 12, in which the preset differential cumulative volume value is software adjustable.

14. The valve assembly according to claim 13, in which the first and second summing means, the difference determining means, the storage means, and the comparator means are all contained within an integral microcontroller.

15. The valve assembly according to claim 11, in which the first and second summing means and difference determining means comprise means for providing digital output signals from said first and second sensing means at predetermined time intervals and means for adding up the digital output signals from one of the sensing means and substracting the digital output signals from the other of the sensing means.

16. The valve assembly according to claim 15, in which the preset differential cumulative volume value is software adjustable.

17. The valve assembly according to claim 16, in which the first and second summing means, the difference determining means, the storage means, and the comparator means are all contained within an integral microcontroller.

18. The valve assembly according to claim 10, in which the first sensing means is a target flowmeter and a signal emitted therefrom of a first polarity, and the second sensing means is the same target flowmeter and a signal emitted therefrom of a polarity opposite to the first polarity.

* * * * *